United States Patent [19]

Eichelberger et al.

[11] 4,368,348

[45] Jan. 11, 1983

[54] VACUUM CLEANER HOSE WITH AN ELECTRICAL CONDUCTOR

[75] Inventors: Leo Eichelberger, Rüsselsheim; Georg Endres, Frankfurt-Nied, both of Fed. Rep. of Germany

[73] Assignee: Techno-Chemie Kessler & Co. GmbH, Frankfurt, Fed. Rep. of Germany

[21] Appl. No.: 213,883

[22] Filed: Dec. 8, 1980

[30] Foreign Application Priority Data

Dec. 21, 1979 [DE] Fed. Rep. of Germany ....... 2951630
Nov. 24, 1980 [DE] Fed. Rep. of Germany ....... 3044068

[51] Int. Cl.$^3$ .......................... F16L 11/12; A47L 9/24
[52] U.S. Cl. ...................................... 174/47; 138/111; 174/97
[58] Field of Search .................. 174/15 C, 24, 47, 95, 174/96, 97, 101.5, 113 AS, 117 AS; 138/103, 111, 115, 116, 117

[56] References Cited

U.S. PATENT DOCUMENTS

| 466,250 | 12/1891 | Marsh | 174/113 AS X |
|---|---|---|---|
| 1,337,080 | 4/1920 | Krone | 174/47 X |
| 2,123,209 | 7/1938 | Rost | 174/95 X |
| 2,648,720 | 8/1953 | Alexander | 174/113 AS X |
| 2,804,494 | 8/1957 | Fenton | 174/113 AS |
| 3,715,454 | 2/1973 | Kleykamp | 174/47 |
| 4,064,355 | 12/1977 | Neroni et al. | 174/47 |
| 4,194,081 | 3/1980 | Medford et al. | 174/47 |

FOREIGN PATENT DOCUMENTS

| 43902 | 3/1966 | Fed. Rep. of Germany . | |
|---|---|---|---|
| 2045218 | 3/1972 | Fed. Rep. of Germany | 174/47 |
| 2127195 | 12/1972 | Fed. Rep. of Germany | 138/117 |
| 2705335 | 8/1977 | Fed. Rep. of Germany | 174/47 |
| 2640161 | 3/1978 | Fed. Rep. of Germany | 174/47 |
| 869299 | 11/1941 | France | 174/47 |
| 323095 | 8/1957 | Switzerland | 174/47 |
| 1467961 | 3/1977 | United Kingdom . | |

*Primary Examiner*—Laramie E. Askin
*Attorney, Agent, or Firm*—W. G. Fasse; D. H. Kane, Jr.

[57] ABSTRACT

A vacuum cleaner hose is equipped with an electrical cable which runs in parallel to the longitudinal axis of the vacuum cleaner hose in a groove or in contact with a flattened portion of the vacuum cleaner hose which is encased together with the electrical conductor by an outer jacketing hose. Alternately, the cable may be enclosed in a smaller diameter hose which in turn is connected to the outer wall of the vacuum cleaner hose in the groove formed in the vacuum cleaner hose. The electrical cable may be embedded in a foam material which forms a segment of the vacuum cleaner hose inside the jacketing hose.

9 Claims, 5 Drawing Figures

U.S. Patent   Jan. 11, 1983   Sheet 2 of 2   4,368,348
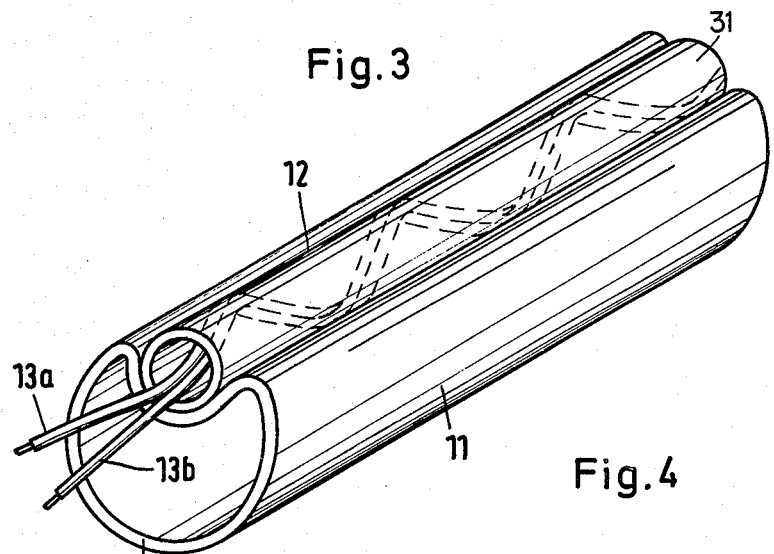
Fig.3
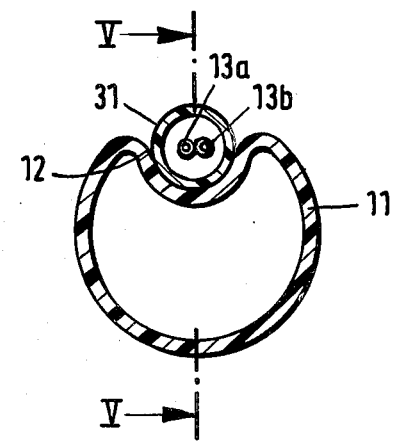
Fig.4
Fig.5
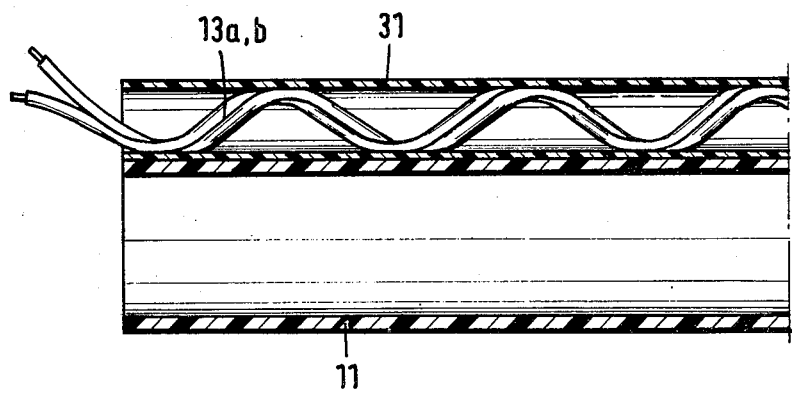

4,368,348

VACUUM CLEANER HOSE WITH AN ELECTRICAL CONDUCTOR

BACKGROUND OF THE INVENTION

The invention relates to a vacuum cleaner hose with an electric conductor in a groove of the hose wall. Different embodiments of such hoses are known.

For example, the Pat. No. 87 344 of the German Democratic Republic shows a synthetic material hose with an electric conductor which is made of a copper wire worked into the wall. Such a structure requires that the wall thickness of the hose material is sufficient.

In many instances, however, it is desirable to keep the wall thickness of such hoses as small as possible. In this instance, the hose is made of easily flexible material and suitably the hose forms a self-supporting unit in the form of a vacuum hose.

For example, German Patent Publication (DE-OS) No. 27 05 335 shows such a hose in which the hose is provided with screw type grooves. The grooves are outwardly open and serve for taking up an electric conductor. The conductor is held in position by the dove-tailed cross-section. This known structure, however, requires an electrical conductor of unnecessary length and a certain manufacturing method for the hose.

SUMMARY OF THE INVENTION

It is the purpose of the invention to provide a hose of the first mentioned type in which the groove for receiving the electrical conductor may be produced by a deforming, for example, pressing or, if desired, by a subsequent heat deformation. Thus, the disadvantages of the known structures are obviated, namely a structure of heavy weight, an insufficient flexibility, an optically ugly structure, as well as the danger of getting stuck.

In a vacuum hose with an electrical conductor in a groove of the hose wall, the invention achieves its purpose in that the groove formed by an inward deviation of the wall of an inner hose extends in parallel to the hose axis, and in that the inner hose is closely enveloped or jacketed by an outer hose having a circular cross-section.

In a modified embodiment, the groove of the inner hose may be replaced by a flat portion. In both instances, the electrical conductor may be located in a foam material segment.

A further modification of the invention is possible in such a manner that the electrical conductor itself is located in a thin hose which in turn is located in the outwardly open groove of the wall of the vacuum cleaner hose. In this structure, the thin hose, as well as the vacuum cleaner hose, may have corrugated walls. Instead, the walls of the thin hose may be smooth and only the walls of the vacuum cleaner hose may be corrugated.

BRIEF FIGURE DESCRIPTION

Several embodiments of the invention are shown, for example, schematically as well as perspectively and partially in section, wherein:

FIG. 3 is a further modification of this embodiment;

FIG. 4 is a vertical section of the illustration according to FIG. 3; and

FIG. 5 is a vertical longitudinal section along Section Line V—V in FIG. 4.

DETAILED DESCRIPTION OF PREFERRED EXAMPLE EMBODIMENTS AND OF THE BEST MODE OF THE INVENTION

Figure 1:
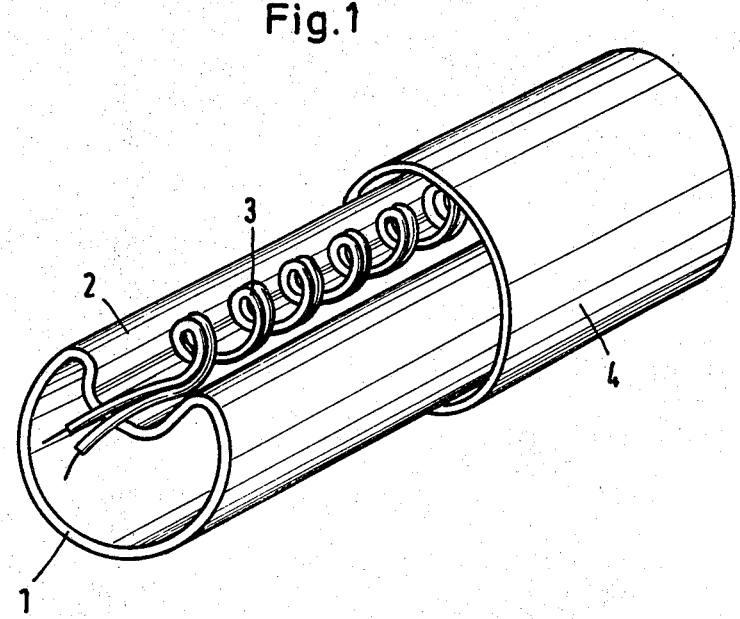
FIG. 1 shows a first perspective view of an embodiment.

In the embodiment of FIG. 1 the hose cross-section of the hose 1 deviates inwardly and forms a groove 2 as an outer indentation. A single core or multiple core cable 3 is located in the groove. The cable 3 may also be replaced by a thin hose.

The inner hose 1 with the cable 3 or with the thin hose lying on its outer side is jacketed by a hose 4 having a circular cross-section.

Figure 2:
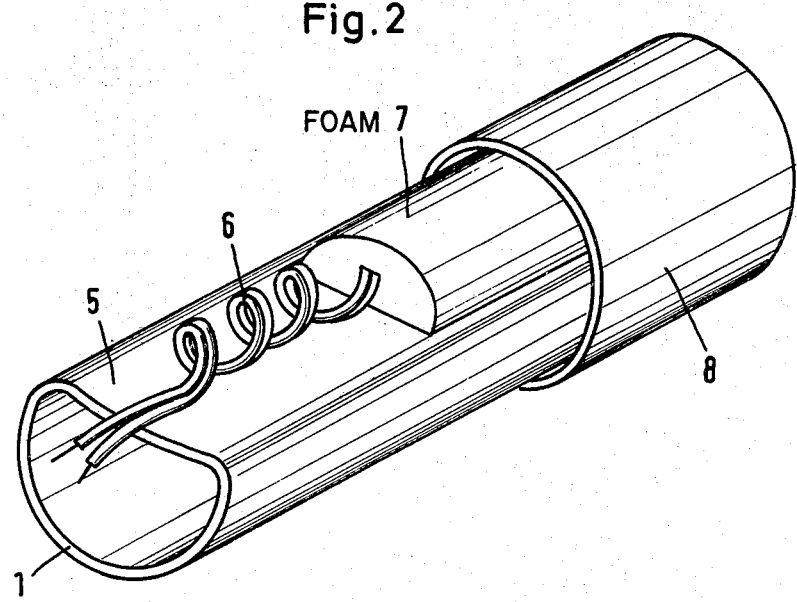
FIG. 2 is a modification of the embodiment of FIG. 1.

In the embodiment of FIG. 2 the deviation of the hose cross-section of the inner hose 1 forms an outer flat portion 5. The cable 6 or a thin hose lie in a foam material segment 7 lying on the outer flat portion 5. The inner hose 1 and the foam segment 7 are jacketed by a hose 8 having a circular cross-section.

The inner hose 1 may be produced in any desired manner as a smooth or ribbed or extruded or wound hose which may be reinforced if desired. The same applies to the outer hose 4 which is suitably made to be very thin-walled and which adapts itself, if desired, to the selected contours of the inner hose 1.

In the embodiment according to FIGS. 3-5, the groove 12 of the hose 11 extends also in parallel to the hose axis.

A thin hose 31 is inserted into the groove 12. The wires 13a, 13b of the electrical cable are located in the thin hose. The thin hose 31 as well as the vacuum cleaner hose 11 may have corrugated walls.

The construction may also be such that the wall of the thin hose 31 is smooth and that the wall of the vacuum cleaner hose 11 is corrugated. Both hoses may have a smooth wall as shown in FIGS. 3, 4 and 5.

The hose according to the invention may be manufactured, for example, in a simple manner in that a thin hose 31 provided with an electrical cable is placed onto the hose 11 having a circular cross-section. The hose 31 is pressed radially inwardly into the wall of the hose 11 thereby forming the groove 12 and thereby simultaneously connecting the thin hose 31 with the wall of the hose 11, for example by a termperature bonding as part of the above mentioned extruding or winding. The inner hose 11 may be produced in any desired manner as a smooth, a ribbed, an extruded, or a wound hose which may be reinforced if necessary. The same applies to the thin hose 31.

The special advantages of the vacuum cleaner hose according to the invention are seen particularly in a weight reduction for the electrical cable as well as in a very good flexibility of the hose.

The invention is not limited to the illustrated embodiments. Rather, details may be adapted to the respective requirements without departing from the basic teaching of the invention.

We claim:

1. A vacuum cleaner hose, comprising a first flexible hose (11) having a given large diameter for forming a first, dust conveying conduit, a portion of the wall of said first flexible hose being radially inwardly indented and forming a single relatively narrow outwardly open channel (12) extending along the length of said flexible hose (11), a second flexible hose (31) located in said narrow channel (12) and connected to the outer surface of the wall of said first flexible hose (11), said second flexible hose (31) having a diameter smaller than said given large diameter of the first flexible hose for providing a second conduit, and electrical conductor means (13a, 13b) extending through said second conduit, said electrical conductor means being separated from said first dust conveying conduit.

2. The vacuum cleaner hose of claim 1, wherein said narrow channel (12) is formed simultaneously with the manufacture of the first flexible hose (11) by pressing the second flexible hose (31) radially inwardly against the wall of the first flexible hose (11) while simultaneously connecting the second flexible hose (31) to the wall of the first flexible hose (11).

3. The vacuum cleaner hose of claim 1 or 2, wherein said second flexible hose has a given outer diameter, said narrow channel having such a radial depth that a radially outer generatrix of said second flexible hose approximately coincides with a generatrix of said first flexible hose.

4. The vacuum cleaner hose of claim 1 or 2, wherein said first and second flexible hoses have smooth walls.

5. The vacuum cleaner hose of claim 1 or 2, wherein said first and second flexible hoses have corrugated walls.

6. The vacuum cleaner hose of claim 1 or 2, wherein said first flexible hose has a corrugated wall and wherein said second flexible hose of smaller diameter has a smooth wall.

7. The vacuum cleaner hose of claim 1 or 2, wherein said first flexible hose has a smooth wall and wherein said second flexible hose has a corrugated wall.

8. The vacuum cleaner hose of claim 1 or 2, further comprising an outer hose (4, 8) encasing said first and second hoses (11, 31).

9. The vacuum cleaner hose of claim 1 or 2, wherein said electrical conductor means are helically arranged in said second flexible hose.

* * * * *